(12) United States Patent
Lewis et al.

(10) Patent No.: US 7,470,453 B1
(45) Date of Patent: Dec. 30, 2008

(54) METHOD FOR FORMING FLEXIBLE COMPOSITES USING POLYMER COATING MATERIALS

(75) Inventors: William Christopher Lewis, Algonquin, IL (US); William James Lewis, Woodstock, IL (US); Steven Fuessle, Lake Zurich, IL (US); Marc W. F. Lewis, McHenry, IL (US)

(73) Assignee: Advanced Flexible Composites, Inc., Lake in the Hills, IL (US)

( * ) Notice: Subject to any disclaimer, the term of this patent is extended or adjusted under 35 U.S.C. 154(b) by 42 days.

(21) Appl. No.: 11/249,035

(22) Filed: Oct. 11, 2005

(51) Int. Cl.
*B05D 1/38* (2006.01)
*B05D 1/02* (2006.01)
*B05D 1/18* (2006.01)
*B05D 1/28* (2006.01)

(52) U.S. Cl. .................. 427/407.1; 427/412; 427/372.2; 427/427.4; 427/428.01; 427/430.1

(58) Field of Classification Search ............... 427/407.1
See application file for complete search history.

(56) References Cited

U.S. PATENT DOCUMENTS

| | | | |
|---|---|---|---|
| 2,681,324 A | 6/1954 | Hochberg | |
| 2,710,266 A | 6/1955 | Hochberg | |
| 3,455,774 A | 7/1969 | Lindsey et al. | |
| T884,008 I4 | 3/1971 | Gumerman | |
| 3,579,370 A | 5/1971 | Punderson et al. | |
| 3,582,458 A * | 6/1971 | Haller | 442/228 |
| 3,616,177 A | 10/1971 | Gumerman | |
| 3,642,569 A | 2/1972 | Gerow | |
| 3,968,297 A | 7/1976 | Sauer | |
| 3,970,627 A | 7/1976 | Seymus | |
| 3,981,945 A | 9/1976 | Attwood et al. | |
| 3,986,993 A | 10/1976 | Vassiliou | |
| T952,005 I4 | 11/1976 | Attwood et al. | |
| 3,993,843 A | 11/1976 | Vasta | |
| 4,011,361 A | 3/1977 | Vassiliou et al. | |
| 4,016,125 A | 4/1977 | Vassiliou et al. | |
| 4,017,555 A | 4/1977 | Alvarez | |
| 4,039,497 A | 8/1977 | Troussier et al. | |
| 4,039,713 A | 8/1977 | Vassiliou | |
| 4,049,863 A | 9/1977 | Vassiliou | |
| 4,054,705 A | 10/1977 | Vassiliou | |
| 4,066,183 A | 1/1978 | Armstrong | |
| 4,070,525 A | 1/1978 | Vassiliou et al. | |
| 4,087,394 A | 5/1978 | Concannon | |
| 4,100,113 A | 7/1978 | McCain | |
| 4,113,912 A | 9/1978 | Okita | |
| 4,122,226 A | 10/1978 | Vassiliou | |
| 4,123,401 A | 10/1978 | Berghmans et al. | |
| 4,131,711 A | 12/1978 | Attwood | |
| 4,139,576 A | 2/1979 | Yoshimura et al. | |
| 4,156,049 A | 5/1979 | Hodes et al. | |
| 4,157,273 A | 6/1979 | Brady | |
| 4,165,404 A | 8/1979 | Quehl | |
| 4,169,117 A | 9/1979 | Vasta | |
| T988,008 I4 | 11/1979 | Mayer et al. | |
| 4,177,320 A | 12/1979 | Yoshimura et al. | |
| 4,180,609 A | 12/1979 | Vassiliou | |
| 4,212,923 A | 7/1980 | Brady | |
| 4,228,219 A | 10/1980 | Hoy et al. | |
| 4,278,776 A | 7/1981 | Mauro et al. | |
| 4,284,668 A | 8/1981 | Nixon | |
| 4,287,112 A | 9/1981 | Berghmans | |
| 4,335,030 A | 6/1982 | Concannon | |
| 4,335,238 A | 6/1982 | Moore et al. | |
| 4,339,565 A | 7/1982 | Tomoda | |
| 4,395,445 A | 7/1983 | Gebauer et al. | |
| 4,399,183 A | 8/1983 | Withers | |
| 4,401,711 A | 8/1983 | Silva et al. | |
| 4,421,878 A | 12/1983 | Close | |
| 4,447,478 A | 5/1984 | Close | |
| 4,546,141 A | 10/1985 | Gebauer | |
| 4,610,918 A | 9/1986 | Effenberger et al. | |
| 4,654,235 A | 3/1987 | Effenberger et al. | |
| 4,943,473 A * | 7/1990 | Sahatjian et al. | 442/289 |
| 5,049,437 A | 9/1991 | Tannenbaum | |
| 5,079,073 A | 1/1992 | Tannenbaum | |
| 5,250,356 A | 10/1993 | Batzar | |
| 5,258,441 A | 11/1993 | Nagahiro et al. | |
| 5,468,798 A * | 11/1995 | Leech | 524/440 |
| 5,562,991 A | 10/1996 | Tannenbaum | |
| 5,708,128 A | 1/1998 | Oikawa et al. | |
| 5,709,949 A * | 1/1998 | Chen et al. | 428/421 |
| 5,714,434 A * | 2/1998 | Takeuchi et al. | 503/227 |
| 6,846,570 B2 | 1/2005 | Leech et al. | |
| 2001/0019770 A1* | 9/2001 | Eian et al. | 428/402.2 |
| 2002/0123282 A1 | 9/2002 | McCarthy et al. | |
| 2003/0044619 A1 | 3/2003 | Leech et al. | |

* cited by examiner

*Primary Examiner*—William Phillip Fletcher, III
(74) *Attorney, Agent, or Firm*—Pauley Petersen & Erickson

(57) ABSTRACT

A method for forming a flexible composite useful for forming belts that are processed into pressure sensitive tapes or converted into rolled goods. The method impregnates a flexible substrate with a polymer coating that includes a thermoplastic or thermoset resin that is not a fluoropolymer. The impregnating coating layer may also include a fluoropolymer. Additional fluoropolymer polymer overcoating layers are applied to the impregnating layer to form the flexible composite. The coating layers are applied as a liquid and dried.

27 Claims, No Drawings

METHOD FOR FORMING FLEXIBLE COMPOSITES USING POLYMER COATING MATERIALS

BACKGROUND OF THE INVENTION

This invention is directed to flexible composites formed by coating a flexible substrate with a polymer material. Flexible composites made according to this invention can be formed into belts, processed into pressure sensitive tapes, or converted into rolled goods. Conveyor belts made from such composites can be used, for example, in the food processing industry for dough pressing applications and for transporting food through cooking applications. Pressure sensitive tapes and converted fabrics made from such composites can be used, for example, in the packaging industry for processing plastic bags as a release material.

Fluoropolymers have been used to create non-stick, flexible composites for over 50 years for use in the food cooking industries and the textile industries. Fluoropolymers are desirable as they provide high temperature stability, low surface energies that provide non-stick surfaces, and good flexibility. Belts composed of such composites are used, for example, in food processing facilities, where the food is conveyed through an oven or series of ovens on a fluoropolymer/fiberglass belt.

Typically, these flexible composites are manufactured in multiple layers, with the initial layers being used to impregnate a flexible base substrate. These impregnation layers are typically applied in a coating operation that involves one or more passes through a coating tower, with the impregnation passes occurring until the substrate is sufficiently closed, or free of voids or porosity. Once closed, subsequent coating layers are applied to the impregnated substrate to build film thickness on top of the flexible substrate and to build smoother surfaces with enhanced non-stick properties. Multiple thin layers, from multiple passes through the coating operation, are generally required in order to prevent mud-cracking the coating surface.

The use of non-stick coating systems for metallic cookware has been known for over twenty years. As with flexible substrates, these coatings are applied in multiple layers consisting, typically, of a primer and a topcoat, but also can incorporate one or more midcoats. The primers used in these systems typically contain a heat resistant thermoplastic plastic binder, one or more fluoropolymer resins, pigments and fillers. In the primer, the thermoplastic and fluoropolymer are attached to each other via a mechanical bond, while the midcoats and/or topcoats are attached to one another via the fusing of fluoropolymer resins from each layer. An early such system is found in U.S. Pat. No. 4,049,863 to Vassiliou.

In the development of both flexible substrate and metallic cookware coatings, it is generally known that hard fillers can be used to increase the abrasion resistance and significantly reduce the cold-flow of the fluoropolymers. For examples see U.S. Pat. No. 4,049,863, U.S. Pat. No. 5,250,356 to Batzer, and U.S. Pat. No. 5,562,991 to Tannenbaurm. Typically, these hard fillers are inorganic and consist of hard metals, metal ceramics, ceramics, mica, and/or carbon-based materials. These materials continue to be the hard fillers generally used for both flexible substrate and cookware coatings.

Although significant research and use of thermoplastics have been prevalent in the cookware industry, heat resistant thermoplastics have not been widely used in flexible substrate coatings.

Flexible substrate based fluoropolymer materials tend to have a much shorter life than their cookware counterparts. This shorter lifecycle can be attributed significantly to the fragile nature of the substrate being coated. In cookware, the substrate of choice is typically aluminum. In flexible composites, it is typically woven fiberglass fabric. Fiberglass/fluoropolymer flexible composites typically have two methods of failure: mechanical failure and coating failure. Mechanical failure occurs when the fabric is torn or punctured, and is typically caused by human or equipment error or substrate degradation. Coating failure occurs when the substance contacting the fluoropolymer surface begins to stick, and is typically caused by the wearing or cracking of the fluoropolymer coating.

This faster rate of coating failure of flexible composite generally occurs because the fragile nature of the substrate prevents the addition of hard fillers at the high loading levels seen cookware coatings. Flexible composite fillers must be added in the midcoats and typically can only be added up to 10% by weight, while in cookware, hard filler loadings can be applied directly to the substrate and can have loading levels as high as 35% by weight. These hard fillers limit the cold-flow of the fluoropolymer coating and strengthen the fluoropolymer matrix.

Further, because of the fragile nature of fiberglass substrates, certain precautions typically must be taken in order to prevent the loss of tensile strength, tear strength, flexibility, and adhesion to the fabric. Typically, flexible substrates must be first impregnated (initially coated) with pure fluoropolymer resins in order to lubricate and protect the fiberglass filaments and yarns from abrading against each other. Although lubricating materials such as silicone fluids, waxes, and fluorosilicone-based materials can be incorporated into the initial impregnation coating(s), the majority of the coating, typically over 95%, is often fluoropolymer resin in order to maintain adhesion to the fiberglass.

It is generally known that the inclusion of fillers and pigments in the impregnation coating layers has a detrimental effect on the fiberglass tear strength and adhesion. U.S. Pat. Nos. 4,610,918 and 4,654,235 to Effenberger and U.S. Patent Application Publication 2002/0123282 to McCarthy disclose that woven fabrics are to be initially coated with fluoropolymer materials before the addition of fillers. To be effective, filler materials must be introduced in the overcoat layers of the coating, once the material has been fully impregnated (closed) by the fluoropolymer coating. If introduced before the flexible substrate has been closed, the fillers, which are typically abrasive materials, contact the glass surface and begin to degrade the properties of the substrate.

Although the use of non-fluorinated, heat resistant plastics (e.g., thermoplastics and thermosets) are well known to the cookware industry, these materials have had limited use in the coated flexible substrate industry. Although their use as fiberglass coatings has been disclosed in U.S. Pat. No. 6,846,570 to Leech, the coating, as disclosed, would not be viable due to the inclusion of high levels of ceramic fillers and pigments during the impregnation layers of the coating. As described by U.S. Pat. No. 6,846,570, the hard ceramics and pigments would create inter-filament abrasion that prevents the lateral movement of the glass filaments in a yarn and will result in substantially reduced tear strength and adhesion. Reduced tear and adhesion is a well-known and documented effect of these hard, abrasive materials against fiberglass. To be flexible and tear resistant, each filament in a fiberglass yarn must be free to move laterally in order to absorb the stresses of flexing. If this free movement is inhibited in any way, or if an abrasive material is incorporated in between filaments, the material significantly looses tear strength.

Due to the fragile nature of flexible substrates, the use of heat resistant plastics and thermosets has not been prevalent in the flexible composite industry. In fact, the use of such materials, to date, has been as a binder in the "overcoat" (midcoat) layers of the coating, after the substrate has been impregnated with fluoropolymer, and not as a primer layer, as in the cookware industry. U.S. Pat. Nos. 4,610,918 and 4,654,235 to Effenberger and U.S. Patent Application 2002/0123282 by McCarthy et al., disclose the use of thermoplastic/thermoset additives in the overcoat (i.e., midcoats) layers of non-stick, flexible substrate coatings. The "overcoat" layers, as disclosed by Effenberger are the layers of coatings applied after the woven substrate has been initially coated (impregnated) with fluoropolymer resins. Further, Effenberger states that these impregnation coatings are applied in two passes, minimally, and that these initial coatings are needed in order to minimize the stiffness of the composite and to facilitate adhesion to the substrate. McCarthy states that the initial coats constitute passes 1-3 through the coating oven and discloses that incorporating a high modulus thermoplastic or filler into the base pass on a woven fiberglass substrate may lead to a brittle product (low tear strength).

There is a need for a composite material that can be applied directly to flexible substrates and provide a hard, yet flexible, coating that will protect the flexible substrate from puncture, tear, and abrasion. There is also a need for an additive that, when added to fluoropolymer materials, prevents the fluoropolymer from cold-flowing and thus holds the coating in place even during periods of intense pressure on the substrate. There is further a need for a hard, flexible coating that would protect the flexible substrate and enable the application of overcoats that contain significantly higher percentage of fillers, thus enabling the coating to better withstand wear and abrasion. There is also a need for a flexible, conformable composite that retains its properties after folding and creasing. There is still yet a further need for a cost-effective, flexible composite material that possesses excellent dielectric properties and can be utilized in the manufacture of flexible circuitry.

SUMMARY OF THE INVENTION

A general object of the invention is to provide an improved flexible composite that incorporates non-fluoropolymer thermoplastic or thermoset materials.

A more specific objective of the invention is to overcome one or more of the problems described above.

The general object of the invention can be attained, at least in part, through a method for forming a flexible composite. The method includes providing a flexible substrate and applying a high temperature resistant polymer to the flexible substrate. The polymer is a thermoplastic or thermoset polymer and not a fluoropolymer. The flexible substrate is dried to coat the flexible substrate with the polymer.

The invention further comprehends a method for forming a flexible composite from a provided flexible substrate. The method includes forming a first polymer coating on the flexible substrate by applying a polymer mixture to the flexible substrate and drying the flexible substrate. The polymer mixture includes a first polymer that is not a fluoropolymer and a second polymer that is a fluoropolymer. The method also includes forming a second polymer coating on the flexible substrate by applying a fluoropolymer dispersion to the flexible substrate and drying the flexible substrate.

The invention further comprehends a method for forming a flexible composite from a provided flexible substrate. The method includes applying a dissolved polyamide imide polymer to the flexible substrate and drying the flexible substrate to coat the flexible substrate with the polyamide imide polymer.

It has been discovered that thermoplastic and/or thermoset materials can be applied directly to a flexible substrate in the impregnation passes, but their incorporation method and addition are generally dependent on their affinity to adhere to the substrate. For thermoplastics and thermosets that do not adhere to the flexible substrate, it was found that these materials can be added at any level without decreasing the tear strength of the substrate; as long as the thermoplastic or thermoset did not mechanically bond to the individual filaments and prevent the lateral movement of the filaments in the yarns of the flexible substrate. Any mechanical bonding can be overcome by adding a very small amount of a lubricant, such as silicone fluid, to the coating mixture. However, the amount of silicone fluid is desirably limited, as although silicone fluid has the positive affect of preventing the mechanical bonding of filaments, it can have an undesirable affect of decreasing the adhesion of the coating to the substrate.

For thermoplastics and thermosets that do adhere to the substrate, it has been found that these materials could be incorporated under particular conditions. The thermoplastic or thermoset material is desirably sufficiently small in size when used, such that, when the material melts, it desirably does not have enough bond strength to lock multiple filaments in a yarn together. Additionally, these small particles are desirably added at sufficiently low levels, to prevent the thermoplastic or thermoset material from attaching to itself and bonding multiple filaments together in a yarn. Examples of suitably small particles for use in this invention include dissolved thermoplastic and/or thermoset materials. It has been discovered, however, that larger particles and higher loading levels of small particles can be incorporated into the coating without decreasing tear strength of the substrate by adding a lubricant to the coating mixture. The lubricant, desirably silicone fluid, prevents the attachment of the thermoplastic or thermoset material to the filaments, but can have a generally undesirable effect of decreasing adhesion of the coating to the substrate, as stated above.

The present invention provides a flexible composite containing very fine, high temperature thermoplastic and/or thermoset materials that are not fluoropolymers, such as, for example, polyethersulfone (PES), polyarylsulfone (PAS), polyamide imide (PAI), polyetheretherketone (PEEK), liquid crystal polymer (LCP), polyetherimide (PEI), polyphenylene sulfone (PPSU), polyarylate, and polyphenylenesulfide (PPS). These polymers are desirably applied directly to the flexible substrate as an initial coating layer using one or more coating passes to obtain the desired layer thickness. The flexible composite of this invention can include one or more high-temperature fluoropolymers in the initial coating layers and/or in subsequent additional midcoat and/or topcoat layers. Examples of desirable fluoropolymers include, without limitation, polytetrafluoroethylene (PTFE), perfluoroalkyl (PFA or MFA) and fluorinated ethylenepropylene (FEP). One or more additives, fillers, and/or pigments can also be added in one or more of the coating layers.

It has been discovered that although larger particle size thermoplastics (10 micron and up) can be incorporated into fluoropolymer containing composites, their addition generally has a significantly negative impact on flexibility and tear strength of the substrate, as described in U.S. Pat. Nos. 4,610,918 and 4,654,235 to Effenberger and as shown in Example VIII below. It has been discovered, however, that by reducing the particle size of the thermoplastic or thermoset materials and/or incorporating a lubricant, such as silicone fluid, with the polymer coating material, it is possible to achieve a composite with flexibility and excellent tear strength.

It has been found that, by reducing the particle size of the thermoplastic or thermoset material below, for example, the size of the smallest filaments in the flexible substrate's yarn, one is able to avoid the tear and adhesion issues previously discovered. Reducing the thermoplastic or thermoset particle size below 1 micron and then introducing the material into a fluoropolymer resin provides flexible composites having improved wear, puncture, creep, tear, and crease resistance characteristics. This invention relates to impregnations that impart the wear and cold-flow resistance of the thermoplastic or thermoset polymers to the fluoropolymer composite being manufactured without sacrificing adhesion. The flexible composite of this invention has good adhesion to the substrate; excellent tear and puncture resistance; outstanding crease resistance and flexibility; low coefficient of friction and excellent release; excellent resistance to cold flow; excellent dielectric properties; and, at certain thermoplastic/thermoset loading levels, increased tensile strength.

Without wanting to be limited by theory, the larger particle size thermoplastics generally lock the filaments of a flexible substrate together, thus preventing each filament from independently moving and flexing upon strain, and thereby reducing tear strength and flexibility. By reducing the particle size of the thermoplastic to be less than the diameter of the smallest filament diameter in a yarn according to this invention, the thermoplastic or thermoset material attaches to an individual filament and does not prevent the independent moving of filaments in a yarn. Generally, the smaller the particle size, the more tear strength and flexibility of the substrate.

Unlike the prior art, such as U.S. Pat. Nos. 4,610,918 and 4,654,235 to Effenberger and U.S. Patent Application 20020123282 to McCarthy, the method of this invention applies the non-fluoropolymer thermoplastic and thermoset resins directly to the flexible substrate. In one embodiment of this invention, these initial layers (which can also include a fluoropolymer) do not require an overcoat layer. The flexible composite has utility with as little as one coating pass through the coating process.

DESCRIPTION OF PREFERRED EMBODIMENTS

The present invention provides a flexible composite including a flexible substrate coated with a thermoplastic and/or thermoset material and a fluoropolymer material. The coating materials of this invention provide durable, non-stick materials for impregnating and coating flexible substrates. The coating materials of this invention may include one or more fluoropolymer resins; one or more heat resistant thermoplastic or thermoset resins; and one or more additives, fillers or pigments such as, silicones and silanes.

The coating materials are applied in one or more layers to a flexible substrate to provide a flexible composite with desirable tear and puncture resistance, crease resistance, and flexibility; a low coefficient of friction and good release; desirable resistance to cold flow; desirable dielectric properties; and, at particular thermoplastic loading levels, improved tensile strength. The method of this invention allows for application of the thermoplastic and/or thermoset materials directly to a flexible substrate without pre-coating the substrate, thereby imparting the preferential properties of the thermoplastic or thermoset directly to the substrate and not just to the coating as disclosed in prior art.

The flexible composites formed by the method of this invention include a flexible substrate. The flexible substrate can be any flexible substrate available for use in forming polymer coated flexible materials. In one embodiment of this invention, the flexible substrate desirably includes a fibrous material. Flexible substrates may include a yarn, filament, monofilament or other fibrous material either as such or assembled as, for example, a textile or any woven, non-woven, knitted, matted, or felted material. Examples of materials useful for forming flexible substrates include, glass, fiberglass, ceramics, graphite (carbon), polybenzimidazole (PBI), PTFE, polyaramides, such as KEVLAR and NOMEX, metals including metal wire or mesh, polyolefins such as TYVEK, polyesters such as REEMAY, polyamides, polyimides, thermoplastics such as KYNAR and TEFZEL, polyether sulfones, polyether imide, polyether ketones, polyetherether keytones, liquid crystal polymers, polysulfones, polysulfides, novoloid phenolic fibers such as KYNOL, cotton, asbestos and other natural as well as synthetic fibers.

In one embodiment of this invention, the method for forming a flexible composite begins with providing a flexible substrate to be coated. A high temperature resistant polymer is applied to the flexible substrate. As used herein, a "high temperature resistant polymer" refers to a polymer material that, alone or in combination with other polymers and/or materials, can withstand a normal operating temperature of at least about 300° F. (about 149° C.), and more desirably about 400-500° F. (about 204-260° C.). The high temperature resistant polymer of one embodiment of this invention is able to be processed at up to about 800° F. (about 427° C.) for a short time without degradation of properties. The high temperature resistant polymer of this invention is a thermoplastic or thermoset polymer that is not a fluoropolymer (although fluoropolymers are generally resistant to high temperatures and used in the coating materials of this invention).

The high temperature resistant polymer can be applied to the flexible substrate using any coating technique known to those skilled in the art for coating, impregnating, or otherwise saturating the flexible substrate. Examples of such coating techniques include, without limitation, dip coating, spray coating, or roll coating. As will be appreciated by those skilled in the art following the teachings herein provided, such coating techniques are also used for any additional polymer coating layers applied to the flexible substrate according to this invention.

In one preferred embodiment, the polymer is applied in a thin layer by dipping the flexible substrate into a tank containing the polymer in, for example, a solution or dispersion. Excess material is desirably metered off, with, for example, rods or wires. After the polymer is applied, the flexible substrate is placed in an oven where the carrier solvent is dried or evaporated off and a film of the polymer is left on the flexible substrate. The polymer film can be left in its unsintered state while awaiting further processing or the polymer film can be sintered (fused) onto the flexible substrate according to techniques known to though of ordinary skill in the art, such as using hot air. Each time the flexible substrate/composite goes through this coating process is considered a "coating pass." In one embodiment of this invention, the flexible substrate goes through more than one coating pass to build layers of the polymer until the desired amount of polymer is impregnated or coated on the flexible substrate. Preferably, the flexible substrate undergoes enough coating passes to fully close the flexible substrate such that substantially no air flow can get through the coating. The flexible substrate is considered "closed" when air flow through the coated flexible substrate is substantially blocked.

In one embodiment of this invention, once the flexible substrate is closed by applying one or more layers including the high temperature resistant polymer, at least one additional polymer coating is applied to overcoat the coated flexible substrate. These one or more overcoat layers desirably include a fluoropolymer and can also include one or more additives. In one embodiment of this invention the fluoropolymer dispersion forming the additional polymer coating is free of the non-fluoropolymer thermoplastic and/or thermoset polymer(s) of the first impregnating layer(s). These overcoat layers can also be applied in one or more coating passes using the techniques discussed above. The overcoat layers can desirably provide a highly durable fluoropolymer-based matrix that acts as a barrier to contaminants such as, greases and oils, and provides a wear resistant coating that prevents the degradation of the fluoropolymer under abrasion stresses. Overcoating or "midcoating" components are commonly known and available to those skilled in the art. A topcoat layer, as is also known in the art, is desirably and typically applied to provide non-stick release typical to fluoropolymer composites.

In one embodiment of this invention, the high temperature resistant polymer is a dissolved polymer. As used herein a "dissolved polymer" is a thermoplastic or thermoset polymer that has been dissolved in a solvent to form a solution. The dissolved polymer, which is not a fluoropolymer, is applied to the flexible substrate in one or more coating passes to coat the flexible substrate. The dissolved polymer can be applied to the flexible substrate alone or in combination as a polymer mixture with a fluoropolymer. In one embodiment of this invention, the dissolved polymer is blended with a dispersion or latex that includes a fluoropolymer. In such an embodiment, the initial coating on the flexible substrate includes both a high temperature resistant polymer which is not a fluoropolymer and a fluoropolymer.

As an alternative to applying as dissolved polymers, the high temperature resistant polymer can be applied to the flexible substrate in a particulate suspension, dispersion, or latex form, either alone or in a polymer mixture with a fluoropolymer. In such an embodiment, a lubricant is used and applied to the substrate with the polymer. As used herein, "lubricant" refers to a material that facilitates the movement of filaments in the flexible substrate and does not bond to the other polymers in the coating mixture. Preferred lubricants are those that can withstand the processing temperatures (up to about 800° F.) and normal operating temperatures (about 400-500° F.), such as, without limitation, silicone fluids or fluorosilicone fluids. It has been discovered that applying, for example, silicone fluid in or with the coating material allows the flexible substrate, and thus the flexible composite, to maintain more flexibility, even when relatively larger polymer particles (i.e., not dissolved) are present in the coating material. The silicone fluid prevents the polymer particles from "locking on" to and between the fibers of the flexible substrate. The locking together of substrate fibers by the polymer particles generally reduces flexibility and results in a more brittle composite. Silicone fluids can also be used in to coating materials including a dissolved polymer discussed above to improve or maintain flexibility. In one embodiment of this invention, the liquid coating materials applied to the flexible substrate include up to about 1.5% by weight silicone fluid, more desirably up to about 1% by weight silicone fluid, and preferably up to about 0.25% by weight silicone fluid.

Examples of high temperature resistant thermoplastic polymers useful for the polymer coatings of this invention include polyethersulfone (PES), polyarylsulfone (PAS), polyamide imide (PAI), polyamide, polyetheretherketone (PEEK), polyetherimide (PEI), polyimide, polyarylene ketone, polyphenylenesulfide (PPS), polyphenylenesulfone, polyorganosiloxanes, polyvinyl alcohol, polyethyloxazoline, ethyl-vinyl alcohol and combinations thereof. Examples of high temperature resistant thermoset polymers useful for the dissolved polymer of this invention include polyester, polyimide, acrylic, bismaleimide, epoxy, phenolic, and silicone. Thermoplastic and thermoset polymers can be present in the coating materials of this invention in amounts from about 0.25% to about 90% by weight, desirably from about 0.50% to about 50% by weight, and more desirably from about 1% to about 30% by weight. The size of the thermoplastic and thermoset particles are desirably smaller than the smallest filament in the yarns of the flexible substrate and, preferably, are smaller than about 1 micron and more preferably in a solution where the particle size is less than about 500 nanometers.

As discussed above, the base coat and/or subsequent additional coating layers of this invention can and desirably include fluoropolymers. A fluoropolymer is a polymer that contains atoms of fluorine. Fluoropolymers are generally characterized by resistance to solvents, acids, and bases. Fluoropolymers known to those skilled in the art for use in substrate coating materials are available for coating the flexible substrate according to this invention. Examples of fluoropolymers include, without limitation, polytetrafluoroethylene (PTFE), perfluoroalkyl (PFA or MFA) and fluorinated ethylenepropylene (FEP). Fluoropolymer resins may comprise approximately 0% to about 99.5% by weight of the solid content of the flexible composite of this invention, and more desirably from about 50% to about 95% by weight.

The coating materials of this invention can also include one or more additives, such as high-temperature additives, fillers, or pigments, depending on need and the polymers used. Additives such as saturants, lubricants, adhesion promoters, film-formers, thickeners, processing aids, and fillers can be added to the composite to provide certain desired properties. Suitable saturants and lubricants include boron nitride, silicone fluids, fluorosilicone fluids, perfluoroelastomers, fluoroelastomers, silanes and processing aids. Suitable adhesion promoters include materials such as silanes that are either compatible with PTFE or the thermoplastic or thermoset resins. Pigments can be added to the composite to obtain the desired composite color. Suitable pigments include mica, graphite, and carbon black. Suitable fillers include glass beads and alumina. Additives, fillers and pigments, as described above, are well known and can be blended into the composite such that they comprise from about 0.25% to about 50% by weight, and more desirably from about 0.50% to 20% by weight.

EXAMPLES

In the following Examples, the tensile strength was measured according to ASTM D902: Standard Test Methods for Flexible Resin-Coated Glass Fabrics. The tear strength was measured according to ASTM D1424: Standard Test Method for Tearing Strength of Fabrics by Falling-Pendulum Type (Elmendorf) Apparatus. The coating adhesion was tested according to ASTM D-4851-97: Standard Test Methods for Coated and Laminated Fabrics for Architectural Use.

Example I

Style 7628 glass fabric was treated with an aqueous PTFE dispersion (D1122—from Daikin America, Orangeburg, N.Y.). The fabric was initially impregnated with a 35% solids PTFE dispersion and then coated with a 50% solids PTFE dispersion at until it reached a thickness of 0.010 inch. Each impregnation and coating pass was dried at approximately 500° F. and then fused at approximately 750° F. The results are summarized in Table 1.

TABLE 1

| | |
|---|---|
| Tensile Strength (lbs/in) - Warp | 286.5 lbs/in |
| Tear Strength - (grams) - Warp | 2,720 grams |
| Tear Strength - (grams) - Fill | 2,399 grams |
| Coating Adhesion - Splice Peel (lbs/in) | 3.0 lbs/in |

Example II

Style 7628 glass fabric was impregnated with an aqueous PTFE D1122 dispersion containing 99.5% by weight of solids PTFE and 0.5% by weight of solids polyamide-imide (from Solvay Advanced Polymers, Alpharetta, Ga.). The impregnation coatings were applied in three coating passes, until the material was closed to air flow, with the impregnating composite at 30% solids. Overcoat passes were applied with an aqueous PTFE dispersion of D1122 at 50% solids until the material reached a thickness of 0.010 inch. Each impregnation and coating pass was dried at approximately 500° F. and then fused at approximately 750° F. The results are summarized in Table 2.

TABLE 2

| | |
|---|---|
| Tensile Strength (lbs/in) - Warp | 276 lbs/in |
| Tear Strength - (grams) - Warp | 4,480 grams |
| Tear Strength - (grams) - Fill | 2,807 grams |
| Coating Adhesion - Splice Peel (lbs/in) | 3.05 lbs/in |

Example III

Style 7628 glass fabric was impregnated with an aqueous solution containing 7% by weight of solids polyamide imide and run for one coating pass. This impregnated coating was then overcoated with an aqueous PTFE AD1070 dispersion at 50% solids until the material reached a thickness of 0.010 inch. Each impregnation and coating pass was dried at approximately 500° F. and then fused at approximately 750° F. During coating adhesion testing, the PTFE overcoat delaminated from the polyamide imide impregnated coating. Table 3 summarizes the testing results.

TABLE 3

| | |
|---|---|
| Tensile Strength (lbs/in) - Warp | 346 lbs/in |
| Tear Strength - (grams) - Warp | 3,649 grams |
| Tear Strength - (grams) - Fill | 3,040 grams |
| Coating Adhesion - Splice Peel (lbs/in) | Delamination |

Example IV

Style 7628 glass fabric was impregnated with an aqueous dispersion containing 90% by weight of solids polyamide-imide (Solvay Advanced Polymers) and 10% by weight of solids silicone fluid ET 4327 (Dow Corning). This impregnated coating was then overcoated with an aqueous dispersion at approximately 40% solids with the solids content consisting of 40% by weight PTFE AD1070 dispersion and 60% by weight polyamide-imide. This overcoating was run for three coating passes. After that, the material was overcoated with an aqueous dispersion at approximately 40% solids with the solids content consisting of 60% by weight PTFE AD1070 dispersion and 40% by weight polyamide-imide. This overcoating was run for three coating passes. Finally, the material was topcoated with an aqueous dispersion of PTFE AD1070 at 50% solids until the material reached a thickness of 0.010 inch. Each impregnation and coating pass was dried at approximately 500° F. and then fused at approximately 750° F. Table 4 summarizes the testing results.

TABLE 4

| | |
|---|---|
| Tensile Strength (lbs/in) - Warp | 364 lbs/in |
| Tear Strength - (grams) - Warp | 2,112 grams |
| Tear Strength - (grams) - Fill | 1,792 grams |
| Coating Adhesion - Splice Peel (lbs/in) | Delamination |

Example V

Style 7628 glass fabric was impregnated with an aqueous PTFE AD1070 dispersion containing 59% by weight of solids PTFE, 39% by weight of solids polyamide-imide (Solvay Advanced Polymers), 1% by weight of solids silicone fluid ET 4327, and 1% by weight of solids aminosilane Z-6020 (Dow Corning). The initial impregnation coatings were applied in three passes, until the material was closed to air flow, with the impregnating composite at 30% solids. Subsequent overcoat passes were applied with an aqueous PTFE dispersion of AD1070 at 50% solids until the material reached a thickness of 0.010 inch. Each impregnation and coating pass was dried at approximately 500° F. and then fused at approximately 750° F. Table 5 summarizes the testing results.

TABLE 5

| | |
|---|---|
| Tensile Strength (lbs/in) - Warp | 329.9 lbs/in |
| Tear Strength - (grams) - Warp | 5,184 grams |
| Tear Strength - (grams) - Fill | 5,504 grams |
| Coating Adhesion - Splice Peel (lbs/in) | 2.40 lbs/in |

Example VI

Style 7628 glass fabric was impregnated with an aqueous PTFE AD1070 dispersion containing 82% by weight of solids PTFE, 10% by weight of solids polyamide-imide (Solvay Advanced Polymers), 7% by weight of solids polyvinyl alcohol Elvanol® 70-06 (Dupont Corporation, Wilmington, Del.), and 1% by weight of solids silicone fluid ET 4327. The initial impregnation coatings were applied in three coating passes, until the flexible composite was closed to air flow, with the impregnating composite at 30% solids. Subsequent overcoat passes were applied with an aqueous PTFE dispersion of AD1070 at 50% solids until the material reached a thickness of 0.010 inch. Each impregnation and coating pass was dried at approximately 500° F. and then fused at approximately 750° F. Table 6 summarizes the testing results.

TABLE 6

| | |
|---|---|
| Tensile Strength (lbs/in) - Warp | 279.5 lbs/in |
| Tear Strength - (grams) - Warp | 5,936 grams |
| Tear Strength - (grams) - Fill | 5,056 grams |
| Coating Adhesion - Splice Peel (lbs/in) | 2.90 lbs/in |

Example VII

Style 7628 glass fabric was impregnated with an aqueous PTFE D1122 dispersion containing 97% by weight of solids PTFE and 3% by weight of solids 3600RP polyethersulfone (PES) (Gharda Chemicals Limited, Newton, Pa.). The initial impregnation coatings were applied in three coating passes, until the material was closed to air flow, with the impregnating coating material at 30% solids. Subsequent overcoat passes were applied with an aqueous PTFE dispersion of D1122 at 50% solids until the material reached a thickness of 0.007 inch. Each impregnation and coating pass was dried at approximately 500° F. and then fused at approximately 750° F. Table 7 summarizes the testing results.

TABLE 7

| | |
|---|---|
| Tensile Strength (lbs/in) - Warp | Not Tested |
| Tensile Strength (lbs/in) - Fill | Not Tested |
| Tear Strength - (grams) - Warp | >6,800 grams |
| Tear Strength - (grams) - Fill | >6,800 grams |
| Coating Adhesion - Splice Peel (lbs/in) | Not Tested |

Example VIII

The following samples were made using PPS (average particle size of 12 microns) and/or PES (average particle size of 10 microns) dispersions obtained from Whitford Corporation, Westchester, Pa., and a PEEK powder (average particle size of 10 microns) from Gharda Chemical Corporation. The PPS was a 40% solids solution, the PES was a 20% solids solution, and the PEEK was a 20% solids solution. The dispersions were added to PTFE (AD1070 (60% solids) from ACG Fluoropolymers) to create a 40% solids solution. Of the solids in the solution, 20% was PPS, PES, or PEEK, and the remainder was PTFE. The appropriate amount of water was added to each sample to achieve 40% solids.

PPS @ 20% Solids in 40% Solids Mix

| Sample # | Tear (Warp) | Tear (Fill) |
|---|---|---|
| Sample 1 | 2,304 grams | 2,049 grams |
| Sample 2 | 2,881 grams | 2,558 grams |
| Sample 3 | 2,558 grams | 2,304 grams |

PES @ 20% Solids in 40% Solids Mix

| Sample # | Tear (Warp) | Tear (Fill) |
|---|---|---|
| Sample 1 | 2,240 grams | 2,431 grams |
| Sample 2 | 2,240 grams | 2,431 grams |
| Sample 3 | 2,163 grams | 2,431 grams |

PPS @ 10% and PES @ 10% Solids in 40% Solids Mix

| Sample # | Tear (Warp) | Tear (Fill) |
|---|---|---|
| Sample 1 | 1,922 grams | 2,240 grams |
| Sample 2 | 1,922 grams | 2,240 grams |

PEEK @ 20% Solids in 40% Solids Mix

| Sample # | Tear (Warp) | Tear (Fill) |
|---|---|---|
| Sample 1 | 1,345 grams | 2,240 grams |
| Sample 2 | 1,345 grams | 2,113 grams |

Adhesion Testing

| Material | Average (lbs/in) | Peak Force (lbs/in) |
|---|---|---|
| PPS | 3.5-4.0 | 5 |
| PES | 3.0-3.5 | 5 |
| PPS/PES | Not Tested | Not Tested |
| PEEK | Not Tested | Not Tested |

Thus, this invention provides flexible composites that have excellent tear and puncture resistance; outstanding crease resistance and flexibility; low coefficient of friction and excellent release; excellent resistance to cold flow; excellent dielectric properties; and increased tensile strength. This invention uses a coating material that has good adhesion to the flexible substrate, and that imparts the wear and cold-flow resistance of the thermoplastic/thermoset polymers to the fluoropolymer composite being manufactured, without sacrificing adhesion.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for forming a flexible composite, the method comprising:
    providing a flexible substrate comprising a fibrous material;
    applying a high temperature resistant polymer directly to the flexible substrate, wherein the polymer is a thermoplastic or thermoset polymer and not a fluoropolymer;
    drying the flexible substrate with the applied polymer to coat the flexible substrate with the polymer; and
    applying a fluoropolymer to the flexible substrate.

2. The method of claim 1, wherein the polymer is selected from a group consisting of polyethersulfone, polyarylsulfone, polyamide imide, polyamide, polyetheretherketone, polyetherimide, polyimide, polyarylene ketone, polyphenylenesulfide, polyphenylenesulfone, polyorganosiloxanes, polyvinyl alcohol, polyethyloxazoline, ethyl-vinyl alcohol, and combinations thereof.

3. The method of claim 1, additionally comprising:
dissolving the polymer in a solvent to form a dissolved polymer; and
applying the dissolved polymer to the flexible substrate.

4. The method of claim 3, wherein the high temperature resistant polymer consists of high temperature resistant polymer particles having a size of is less than about 1 micron.

5. The method of claim 1, additionally comprising applying a lubricant to the flexible substrate.

6. The method of claim 5, wherein the lubricant comprises silicone.

7. The method of claim 5, wherein the high temperature resistant polymer comprises a suspension, a dispersion, or a latex of high temperature resistant polymer particles having a size of at least about 10 microns.

8. The method of claim 1, additionally comprising applying to the flexible substrate an additive selected from a group consisting of a pigment, a filler, a saturant, an adhesion promoter, a film-former, a thickener, a processing aid, and combinations thereof.

9. The method of claim 1, wherein the flexible substrate comprises a material selected from a group consisting of glass, fiberglass, ceramics, graphite, polybenzimidazole, PTFE, polyaramide, metal, polyester, polyamides, polyimides, polyether sulfones, polyether imide, polyether ketones, polyetherether keytones, liquid crystal polymers, polyphenelensulfones, polyphenylenesulfides, novoloid phenolic fibers, cotton, asbestos and combinations thereof.

10. The method of claim 1, wherein applying the polymer to the flexible substrate comprises dip coating, spray coating, or roll coating.

11. The method of claim 1, additionally comprising blending the polymer with a solution comprising a dispersion or latex including the fluoropolymer.

12. A method for forming a flexible composite, the method comprising:
providing a flexible substrate comprising a fibrous material;
applying a high temperature resistant polymer directly to the flexible substrate, wherein the polymer is a thermoplastic or thermoset polymer and not a fluoropolymer;
drying the flexible substrate with the applied polymer to coat the flexible substrate with the polymer; and
applying at least one additional polymer coating to the coated flexible substrate, the at least one additional polymer coating comprising a fluoropolymer.

13. The method of claim 12, wherein the high temperature resistant polymer is selected from a group consisting of polyethersulfone, polyarylsulfone, polyamide imide, polyamide, polyetheretherketone, polyetherimide, polyimide, polyarylene ketone, polyphenylenesulfide, polyphenylenesulfone, polyorganosiloxanes, polyvinyl alcohol, polyethyloxazoline, ethyl-vinyl alcohol, and combinations thereof.

14. The method of claim 12, additionally comprising:
dissolving the high temperature resistant polymer in a solvent to form a dissolved polymer; and
applying the dissolved polymer to the flexible substrate.

15. The method of claim 12, additionally comprising applying a lubricant to the flexible substrate.

16. The method of claim 15, wherein the lubricant comprises silicone.

17. The method of claim 12, additionally comprising applying to the flexible substrate an additive selected from a group consisting of a pigment, a filler, a saturant, an adhesion promoter, a film-former, a thickener, a processing aid, and combinations thereof.

18. The method of claim 12, wherein the flexible substrate comprises a material selected from a group consisting of glass, fiberglass, ceramics, graphite, polybenzimidazole, PTFE, polyaramide, metal, polyester, polyamides, polyimides, polyether sulfones, polyether imide, polyether ketones, polyetherether keytones, liquid crystal polymers, polyphenelensulfones, polyphenylenesulfides, novoloid phenolic fibers, cotton, asbestos and combinations thereof.

19. The method of claim 12, wherein applying the polymer to the flexible substrate comprises dip coating, spray coating, or roll coating.

20. A method for forming a flexible composite, the method comprising:
providing a flexible substrate comprising a fibrous material;
forming a first polymer coating on the flexible substrate by applying a polymer mixture directly to the flexible substrate, the polymer mixture including a first polymer that is not a fluoropolymer and a second polymer that is a fluoropolymer, and drying the flexible substrate with the applied polymer mixture; and
forming a second polymer coating on the flexible substrate by applying a fluoropolymer dispersion to the flexible substrate and drying the flexible substrate with the applied fluoropolymer dispersion.

21. The method of claim 20, wherein the first polymer comprises a high temperature resistant thermoplastic or thermoset polymer.

22. The method of claim 20, wherein the first polymer is selected from a group consisting of polyethersulfone, polyarylsulfone, polyamide imide, polyamide, polyetheretherketone, polyetherimide, polyimide, polyarylene ketone, polyphenylenesulfide, polyphenylenesulfone, polyorganosiloxanes, polyvinyl alcohol, ethyl-vinyl alcohol, and combinations thereof.

23. The method of claim 20, wherein the polymer mixture comprises a silicone fluid.

24. The method of claim 20, wherein the first polymer comprises a dissolved polymer.

25. The method of claim 20, wherein the flexible substrate comprises a material selected from a group consisting of glass, fiberglass, ceramics, graphite, polybenzimidazole, PTFE, polyaramide, metal, polyester, polyamides, polyimides, polyether sulfones, polyether imide, polyether ketones, polyetherether keytones, novoloid phenolic fibers, cotton, asbestos and combinations thereof.

26. The method of claim 20, wherein the fluoropolymer dispersion forming the second polymer coating is free of the first polymer.

27. A method for forming a flexible composite, the method comprising:
providing a flexible substrate;
applying a dissolved polyamide imide polymer directly to the flexible substrate;
drying the flexible substrate with the applied dissolved polyamide imide polymer to coat the flexible substrate with the polyamide imide polymer; and
applying a fluoropolymer, fluoroelastomer, or perfluoroelastomer to the flexible substrate, wherein the fluoropolymer, fluoroelastomer, or perfluoroelastomer is applied at least one of with the dissolved polyamide and in an additional polymer coating on the flexible substrate.

* * * * *